United States Patent [19]

Liao et al.

[11] Patent Number: 4,827,898
[45] Date of Patent: May 9, 1989

[54] GAS STOVE BURNER

[76] Inventors: Wei-Shiun Liao, No. 41-3, Fu-Hsing, Fu-Hsing Tsun 5 Lin; Ding L. Yeh Taur, No. 114, Chi-An, Chi-An Tsun 8 Lin, both of Chi-An Hsiang, Hua-Lien Hsien, Taiwan

[21] Appl. No.: 195,823

[22] Filed: May 19, 1988

[51] Int. Cl.[4] .................. F24C 3/00; F23D 11/44
[52] U.S. Cl. .................. 126/39 E; 431/208; 431/264
[58] Field of Search .......... 126/39 R, 39 E, 214 R, 126/214 A, 214 C, 39 C, 40, 39 G; 431/258, 264, 259, 263, 208

[56] References Cited

U.S. PATENT DOCUMENTS

| | | | |
|---|---|---|---|
| 3,576,382 | 4/1971 | Finnstrand | 431/208 |
| 3,749,077 | 7/1973 | Cross | 431/208 |
| 4,392,811 | 7/1983 | Ito | 431/208 |
| 4,527,539 | 7/1985 | Kay | 126/39 R |
| 4,541,407 | 9/1985 | Sommers et al. | 126/39 R |
| 4,626,196 | 12/1986 | Stohrer, Jr. | 126/39 E |

Primary Examiner—James C. Yeung
Attorney, Agent, or Firm—Browdy and Neimark

[57] ABSTRACT

A gas stove burner including: a preheating body which encompasses so as to directly contact a preheating tube; a housing with a stepped seat, an inner cylindrical wall, and an air mixing tube which opens into a cylindrical chamber between the cylindrical wall and the stepped seat. The stepped seat has a number of inner stepped rings and at least one outer ring for even heating.

1 Claim, 4 Drawing Sheets

GAS STOVE BURNER

BACKGROUND OF THE INVENTION

This invention relates to a burner for gas stoves and in particular to a burner of simplified structure and of high efficiency.

Conventional gas stove burners, as seen in FIG. 4, have several serious drawbacks. First, the preheating effect is not of maximum efficiency because the connection between the preheating tube (a1) and the gasifying disk (b) is poor. Liquified gas, coming in through (a2), spills onto the gasifying disk (b) and the gasifying seat (c). As the gas evaporates, and the vapor pressure increases, vaporized gas is forced out through tubes (a3). Heat is only conducted through the points where the preheating tube (a1) and the gasifying disk (b) contact. Much heat, however, is lost through radiation to the surroundings from the surface area of the preheating tube which does not contact the gasifying disk. Another shortcoming of conventional gas stove burners is that the amount of gas which passes therethrough is too large and the flame proceding therefrom is not evenly distributed. A third shortcoming of the prior art is that the holes are only on the cylindrical wall of the ventilation lid (e), thereby providing a poor heating effect in the area directly above the center of the ventilation lid (e).

It is the purpose of this present invention, therefore, to mitigate and/or obviate the abovementioned drawbacks in the manner set forth in the detailed description of the preferred embodiment.

SUMMARY OF THE INVENTION

A primary objective of this invention is to provide a gas stove burner with an efficient preheater.

Another objective of this invention is to provide an efficient gas stove burner wherein the gas output of the burner is minimized while the heating effect is maximized.

Further objectives and advantages of the present invention will become apparent as the following description proceeds, and the features of novelty which characterize the invention are pointed out with particularity in the claims annexed to and forming a part of this invention.

DETAILED DESCRIPTION OF THE PREFERRED EMBODIMENT

Figure 1:
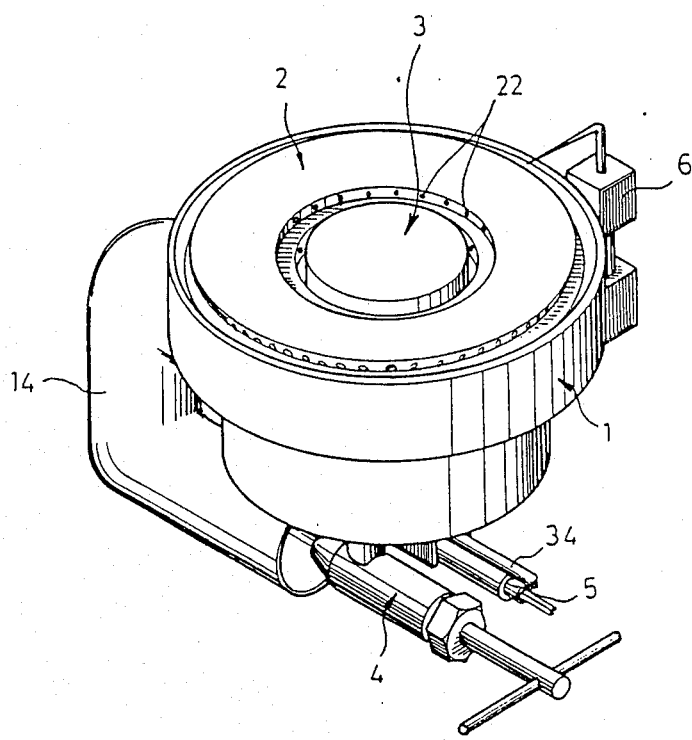
FIG. 1 is a perspective view of a gas stove burner in accordance with the present invention.

Referring to FIG. 1, it can be seen that the present invention comprises a housing 1, a combustion plate 2, a preheating body 3, a nozzle 4, a preheating tube 5, and an ignition 6. Several features of the present invention can be briefly introduced from FIG. 1. The combustion plate 2 includes a multiplicity of gas outlets 22 on inner and outer circumferences thereof. An air mixing tube 14 receives preheated gas from the nozzle 4 and air from the surroundings so that the preheated gas is in an optimum condition for combustion.

Figure 3:
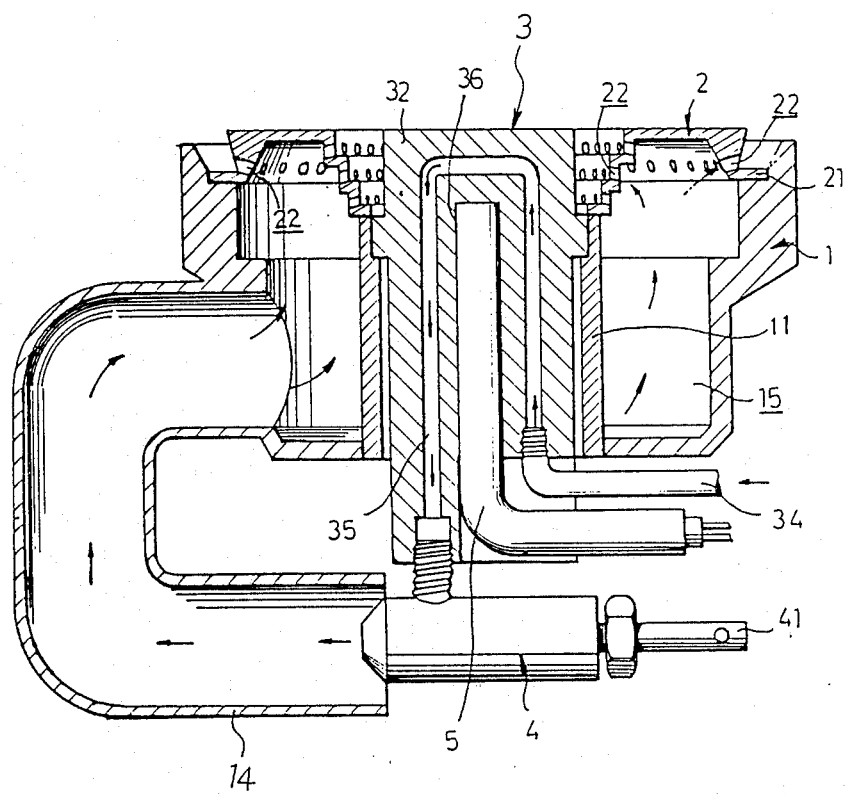
FIG. 3 is a cross-sectional view of a gas stove burner in accordance with the present invention.
Figure 4:
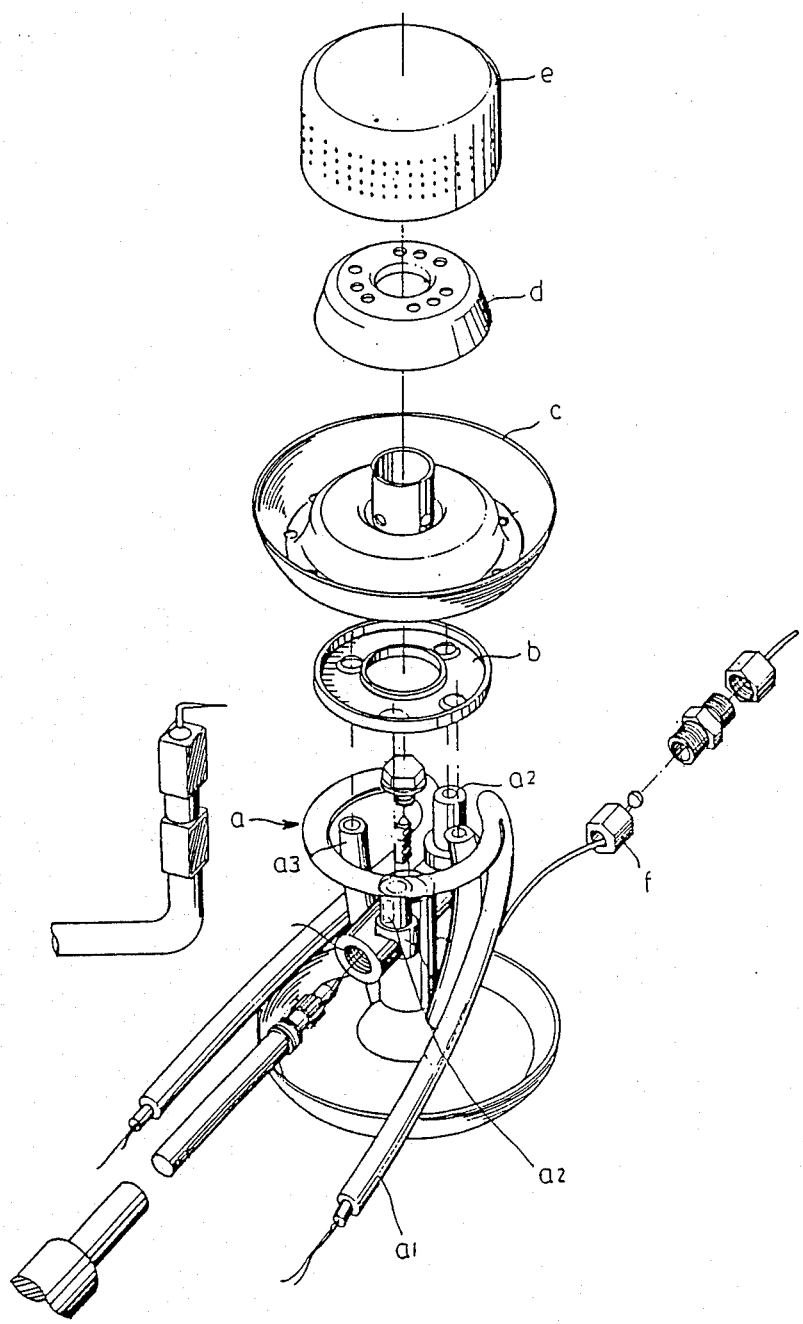
FIG. 4 is an exploded view of a prior art gas stove burner.

Referring to FIG. 3, the structure and operation of the present invention can be understood more clearly. The housing 1 includes a cylindrical wall 11 in the center portion thereof which receives the preheating body 3 therein, an air mixing tube 14 which receives gas from the nozzle 4 and air from the surroundings. Liquified gas is received from gas inlet 34, which is connected to a bottled gas container or gas line. The gas inlet 34 is threadably (or frictionally) received by the preheating body 3 at the entrance of the preheat line 35. This preheat line 35 makes a loop around the preheating tube 5, which is set in the preheat cavity 36 so as to be totally encompassed by said preheating body 3. At the lower end of the preheat cavity 36 there is a receptacle 33 for receiving the lower portion of the preheating tube 5 and the gas inlet 24. The gas inlet 34 is threadably engaged at one end of the preheat line 35 and a nozzle 4 is threadably engaged at the other end thereof. A rest 31 is disposed at an upper portion of the pre-heating body 3 for support thereof on a circular ledge 13. At the top end of the pre-heating body 3, a head 32 is disposed. The head is circular for even heat absorption from the fire of the gas outlets 22. Since the pre-heating body 3 is made of metal, heat is distributed in a fairly uniform manner therealong so that the liquified natural gas (LNG) is evenly heated.

The electrical preheating tube 5 is also set in a cavity 36 in the preheating body 3 substantially along the lengthwise centerline thereof. As liquified gas flows from the entrance of the preheat line (i.e. the gas inlet 34) to the exit of the preheat line (i.e. the nozzle 4), it is heated to form a vapor. In other words, the energy level of the gas is raised so that it is put into an easily combustable gaseous form. The amount of gas flowing into (and out of) the nozzle 4 is easily controllable by a handle 41. From FIG. 3, it can be seen that from the nozzle 4, the preheated gas goes into an air mixing tube 14, where it thoroughly mixes with air. At the other end of the air mixing tube 14 is a housing 1, which may or may not form an integral piece therewith. In the preferred embodiment, however, the tube 14 and the housing 1 form one integral piece. Note that the diameter of the air mixing tube is much larger than the diameter of the opening of the nozzle 4. This is to keep the gas which is coming out of the nozzle 4 from condensing on the entrance of the air mixing tube 14. A combustion plate 2 with a plurality of gas outlets 22 arranged in circular fashion thereon is set on top of the housing 1. The outer rim 21 of the combustion plate 2 is set on the top of the housing 1, on the top stepped seat 16 (see FIG. 2) thereof. The central portion of the combustion plate 2 (i.e. the lowest circular step) is set on the top of the cylindrical wall. Note that there are circular rows of gas outlets 22 on the inner and the outer portions of the combustion plate 2 for more evenly distributed heating than prior art gas burners.

Figure 2:
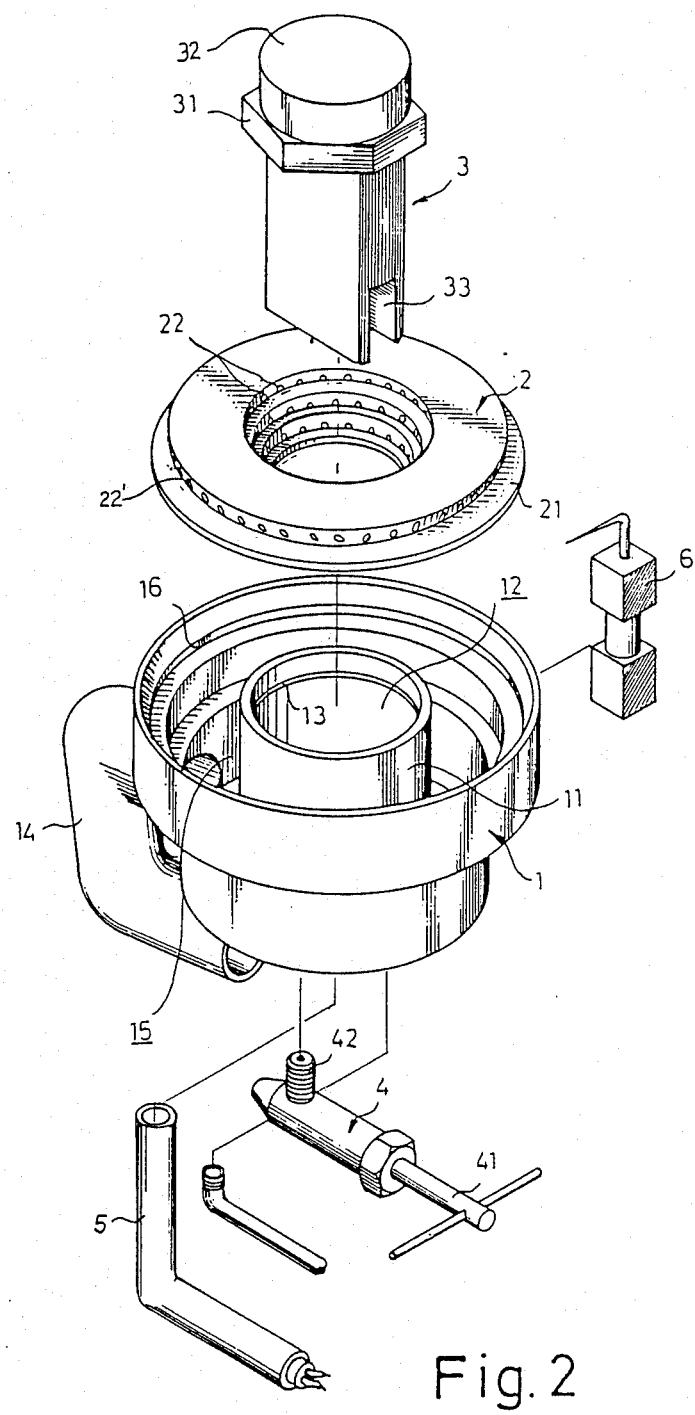
FIG. 2 is an exploded view of the gas stove burner of FIG. 1.

As seen in FIG. 2, the ignition device 6 is external to the rest of the burner. The ignition device 6, in and of itself, is prior art and need not be discussed herein.

As various possible embodiments might be made of the above invention without departing from the scope of the invention, it is to be understood that all matter herein described or shown in the accompanying drawing is to be interpreted as illustrative and not in a limiting sense. Thus it will be appreciated that the drawings are exemplary of a preferred embodiment of the invention.

I claim:

1. An improved gas stove burner comprising:
   (A) a preheating body (3) receiving and totally encompassing an electrical preheating tube (5) in a preheat cavity (36) running axially along a lengthwise centerline thereof; said preheating body (3) having a preheat line (35) formed therein which runs proximate to said Preheating tube (5); liquified gas absorbing heat and being gasified in said preheat line (35);
   (B) a housing (1) including; an inner cylindrical wall (11) in a central portion for receiving said preheating body (3) therein, an air mixing tube (14) with an opening proximate to and in line with an exit of said nozzle for receiving gas from said nozzle (4) and for receiving air from surroundings, and a stepped cylindrical seat (16) which in conjunction with a combustion plate (2) and cylindrical wall (11) forms a cylindrical chamber (15) wherein gas is evenly diffusable; and
   (C) said combustion plate (2) including: a plurality of gas outlets (22) in the central circumferences thereof; at least one outer circumference of gas outlets (22'); and a rim (21') being an integral part of, and forming an outermost diameter of, said combustion plate (2) resting on an uppermost ring of said stepped seat (16).

* * * * *